US010499671B2

(12) United States Patent
Ogino et al.

(10) Patent No.: US 10,499,671 B2
(45) Date of Patent: Dec. 10, 2019

(54) DRIED INSTANT NOODLE AND METHOD FOR PRODUCING THE SAME

(71) Applicant: NISSIN FOODS HOLDINGS CO., LTD., Osaka (JP)

(72) Inventors: Yuma Ogino, Torrance, CA (US); Toshio Yoshinuma, Tokyo (JP); Mitsuru Tanaka, Tokyo (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 227 days.

(21) Appl. No.: 14/914,433

(22) PCT Filed: Sep. 24, 2014

(86) PCT No.: PCT/JP2014/004883
§ 371 (c)(1),
(2) Date: Feb. 25, 2016

(87) PCT Pub. No.: WO2015/045374
PCT Pub. Date: Apr. 2, 2015

(65) Prior Publication Data
US 2016/0213034 A1    Jul. 28, 2016

(30) Foreign Application Priority Data

Sep. 30, 2013 (JP) .................................. 2013-204802

(51) Int. Cl.
*A23L 7/113* (2016.01)
(52) U.S. Cl.
CPC ........... *A23L 7/113* (2016.08); *A23V 2002/00* (2013.01)
(58) Field of Classification Search
USPC ....................................................... 426/557
See application file for complete search history.

(56) References Cited

U.S. PATENT DOCUMENTS

| 5,861,186 | A  | 1/1999  | Akira et al.    |
| 6,224,931 | B1 | 5/2001  | Narimatsu et al. |
| 2011/0229613 | A1 | 9/2011  | Takizawa et al. |
| 2013/0122173 | A1 | 5/2013  | Nagayama        |
| 2013/0251876 | A1 | 9/2013  | Nagayama        |
| 2013/0287921 | A1 | 10/2013 | Nagayama        |
| 2015/0037478 | A1 | 2/2015  | Asahina et al.  |
| 2015/0296845 | A1 | 10/2015 | Asahina et al.  |

FOREIGN PATENT DOCUMENTS

| CN | 1254518      | 5/2000  |
| JP | 53-32145     | 3/1978  |
| JP | S56-09096 B2 | 2/1981  |
| JP | 59-48056     | 3/1984  |
| JP | 59-88055     | 5/1984  |
| JP | 60-37945     | 2/1985  |
| JP | S62-062138 B2 | 12/1987 |
| JP | S63-248366   | 10/1988 |
| JP | 3-251148     | 11/1991 |
| JP | 3-251150     | 11/1991 |
| JP | H07-016371   | 3/1995  |
| JP | 9-51773      | 2/1997  |
| JP | 10-155444    | 6/1998  |
| JP | 2837115      | 12/1998 |
| JP | 11-276105    | 10/1999 |
| JP | 2000-139387  | 5/2000  |
| JP | 2000-217528  | 8/2000  |
| JP | 2001-314163  | 11/2001 |
| JP | 2002-253152  | 9/2002  |
| JP | 3527132      | 5/2004  |
| JP | 2006-288239  | 10/2006 |
| JP | 4381470      | 10/2009 |
| JP | 2011-055789  | 3/2011  |
| JP | 4772160 B1   | 9/2011  |
| JP | 2011-244725  | 12/2011 |
| JP | 4860773      | 1/2012  |
| JP | 4995179      | 8/2012  |
| JP | 2012-170363  | 9/2012  |
| WO | 2010/055860  | 5/2010  |

OTHER PUBLICATIONS

Office Action issued in Taiwan Counterpart Patent Appl. No. 103133469, dated Jan. 28, 2016, along with an english translation thereof.
Search Report issued by PCT/JP2014/004883 patent office in PCT/JP2014/004883 Patent Application No. , dated Dec. 2, 2014.
Singaporean Office Action issued in Counterpart Patent Appl. No. 11201602482P, dated Apr. 11, 2017.
Oleo Science, 2001, vol. 1, No. 10, pp. 1013-1019, and concise explanation thereof in English.

*Primary Examiner* — Lien T Tran
(74) *Attorney, Agent, or Firm* — Greenblum & Bernstein, P.L.C.

(57) ABSTRACT

Disclosed herein are a dried instant noodle improved in loosening at the time of eating and a method for producing the same. The method for producing dried instant noodles comprises: a loosening agent-attaching step in which a loosening agent for noodles is attached to gelatinized noodle strings; a first drying step in which, after the loosening agent-attaching step, hot air having a wind speed of 30 m/s or higher and a temperature of 60° C. to 160° C. is blown onto the noodle strings for 5 to 240 seconds to dry the noodle strings; and a second drying step in which, after the first drying step, the noodle strings are dried with hot air.

4 Claims, No Drawings

DRIED INSTANT NOODLE AND METHOD FOR PRODUCING THE SAME

TECHNICAL FIELD

The present invention relates to a dried instant noodle and a method for producing the same.

BACKGROUND ART

Methods for producing instant noodles can be broadly divided into methods for producing fried (deep-fried) noodles and methods for producing non-fried noodles. Fried noodles are produced by frying gelatinized noodle strings in oil at about 150° C. and then drying the fried noodle strings. On the other hand, non-fried noodles are produced by drying gelatinized noodle strings by a drying method other than deep frying. There are some drying methods, but a general drying method is a hot-air drying method in which noodle strings are dried by blowing hot air having a temperature of about 70 to 100° C. and a wind speed of about 5 m/s or less onto the noodle strings for about 30 minutes to 90 minutes. Other drying methods are a low-temperature drying method in which noodle strings are dried for a long period of time at low temperature and a high-temperature and high-speed air drying method in which high-temperature and high-speed airflow having a temperature of about 100° C. to 200° C. is blown onto noodle strings (see, for example, Patent Literature 1).

Noodle strings of non-fried noodles produced by hot-air drying have a firmer inside structure than those of fried noodles, and therefore the non-fried noodles have a texture closer to that of fresh noodles. Fried noodles are easily loosened at the time of cooking and eating. This is because when noodle strings are fried in oil, their shape is fixed while the noodle strings float to the surface of the oil due to moisture evaporation, and therefore a noodle block is relatively bulky and sticking together of the noodle strings is also relatively less likely to occur. On the other hand, hot air-dried non-fried noodles are produced by putting gelatinized noodle strings into a retainer and drying the gelatinized noodle strings with air, and therefore the noodle strings are gravitationally compressed downward and are likely to come into contact with each other. Particularly, at the bottom of a noodle block, the noodle strings are closely packed together and are therefore likely to stick together, which results in poor loosening at the time of cooking and eating. Further, at the time of cooking, hot water is hard to penetrate into a part where the noodle strings stick together, which causes a problem that such a part is not rehydrated with hot water and therefore has an unpleasant texture.

Meanwhile, conventional instant noodles are generally noodles called "wavy noodles" produced by subjecting noodle strings cut out with a cutting blade to waving treatment in a box-shaped duct called "wave box" placed directly below the cutting blade. In this case, it is possible to reduce contact points between the noodle strings overlapping one another, which is advantageous in that the noodle strings are less likely to stick together also in the step of gelatinization.

On the other hand, reflecting diversified consumer tastes, instant noodles using noodles called "straight noodles" have recently become popular, whose noodle strings have no wave or are less wavy and therefore become substantially straight when rehydrated with hot water (see, for example, Patent Literatures 2 and 3). When such straight noodles are produced by gelatinizing noodle strings by steaming or the like, putting the gelatinized noodle strings into a retainer, and drying the gelatinized noodle strings with hot air, the noodle strings are more likely to be closely packed together as compared to wavy noodles. Particularly, the noodle strings near the bottom surface of the retainer tend to be remarkably dense due to the weight of the noodle strings located thereon, and are therefore more likely to stick together during drying as compared to non-fried wavy noodles. Further, it takes much time to dry the noodle strings due to poor circulation of hot air, which leads to another problem of uneven drying. This also causes poor loosening and rehydration at the time of eating, uneven rehydration, uneven texture, breakage during storage or the like.

As a conventional method for improving the loosening of non-fried noodles, a method is known in which a loosening agent is added to noodle strings by mixing the loosening agent in the noodle strings or by attaching the loosening agent to the surface of the noodle strings (see, for example, Patent Literatures 4 and 5). When such a conventional method is used, loosening-improving effect can be obtained to some degree, but cannot be sufficiently obtained because it is impossible to avoid noodle strings from being closely packed together due to their own weight so that the noodle strings stick together during drying.

Further, as a technique for preventing the sticking of noodle strings, a method is known in which an emulsion is attached to noodle strings in the middle of steaming or just after steaming, and compressed air is blown onto the noodle strings to loosen the noodle strings (see, for example, Patent Literature 6). This method can prevent the sticking of noodle strings during steaming, but cannot sufficiently obtain loosening-improving effect because the moisture content of the noodle strings is not reduced before drying, and therefore the noodle strings are closely packed together due to their own weight and stick together during drying.

Further, as a technique for improving the loosening of noodle strings by reducing the density of the noodle strings to provide gaps between the noodle strings, a method is known in which the moisture content of noodle strings before drying is reduced (see, for example, Patent Literature 7) or a noodle block is dried to be bulky (see, for example, Patent Literature 8).

The method described in Patent Literature 7 is one in which a liquid seasoning containing emulsified animal and vegetable oil and fat is attached to gelatinized noodle strings, the gelatinized noodle strings are heated with overheated steam so as not to be puffed, and the heated noodle strings are dried. According to this method, noodle strings are heated with overheated steam having high energy before the noodle strings are cut, which causes the noodle strings to stick together. Therefore, there is a problem that the noodle strings cannot be well stretched or are broken in the step of stretching noodle strings before cutting so that the noodle strings after cutting vary in weight. On the other hand, since the moisture content of the noodle strings is reduced before drying, the noodle strings can be prevented from being closely packed together due to their own weight. However, the noodles are hard to loosen at the time of eating because of the occurrence of sticking before drying. As a result, noodles that are easily loosened cannot be obtained.

The method described in Patent Literature 8 is one in which hot compressed air is blown from below noodle strings after the noodle strings are dried to a predetermined moisture content. This method is not sufficiently effective, either, because the density of the noodle strings increases due to their own weight before hot compressed air is blown, and therefore the surface of the noodle strings is slowly dried and becomes increasingly viscous, which reduces the loosening effect of hot compressed air.

CITATION LIST

Patent Literatures

PTL 1: JP 9-51773 A
PTL 2: Japanese Patent No. 4381470
PTL 3: Japanese Patent No. 4860773
PTL 4: JP 2000-139387 A
PTL 5: JP 2001-314163 A
PTL 6: JP 3-251150 A
PTL 7: JP 2011-244725 A
PTL 8: JP 3-251148 A

SUMMARY OF INVENTION

Technical Problem

It is therefore an object of the present invention to provide a dried instant noodle that is easily loosened at the time of eating and a method for producing the same.

Solution to Problem

More specifically, the present invention is directed to a method for producing dried instant noodles, including: a loosening agent-attaching step in which a loosening agent for noodles is attached to gelatinized noodle strings; a first drying step in which, after the loosening agent-attaching step, hot air having a wind speed of 30 m/s or higher and a temperature of 60° C. to 160° C. is blown onto the noodle strings for 5 to 240 seconds to dry the noodle strings; and a second drying step in which, after the first drying step, the noodle strings are dried with hot air.

The loosening agent for noodles preferably contains at least one of gum arabic, soybean-derived water-soluble hemicellulose, sucrose fatty acid ester, emulsified oil and fat, and lecithin.

The loosening agent-attaching step is preferably performed by immersing the noodle strings in the loosening agent for noodles or by spraying or showering the loosening agent for noodles onto the noodle strings.

The second drying step is preferably performed by drying the noodle strings with hot air having a temperature of 60 to 100° C. for 20 to 120 minutes.

The gelatinized noodle strings preferably have no wave.

After the first drying step, the noodle strings preferably have a moisture content of 40 to 55%.

Advantageous Effects of Invention

According to the present invention, it is possible to provide dried instant noodles that can be easily loosened at the time of eating because of preventing sticking together of noodle strings caused by an increase in the density of the noodle strings, which is a problem for conventional dried instant noodles, and a method for producing the same.

DESCRIPTION OF EMBODIMENT

Hereinbelow, a method for producing dried instant noodles according to an embodiment of the present invention will be specifically described according to the order of steps. It is to be noted that the present invention is not limited to the following embodiment.

It is to be noted that the type of dried instant noodles to be produced in this embodiment is not particularly limited, and any dried instant noodles commonly known in this technical field may be produced. Examples of such dried instant noodles include wheat noodles, buckwheat noodles, Chinese noodles, and pastas.

1. Mixing of Raw Materials

Dried instant noodles according to this embodiment can be produced using raw materials used to produce conventional instant noodles. Examples of a raw material powder include cereal powders such as wheat flour, buckwheat flour, and rice flour and various starches such as potato starch, tapioca starch, and corn starch. These raw material powders may be used singly or in combination of two or more of them. Other examples of the starches include raw starch and modified starches such as gelatinized starch and etherified starch.

In this embodiment, various materials generally used to produce instant noodles, such as salt, an alkaline agent, any thickener, a noodle quality improver, any dye such as carotene dye, and a preservative, may be added to the raw material powder. These materials may be added as powders to the raw material powder, or may be dissolved or suspended in mixing water before added to the raw material powder.

2. Mixing, Rolling-Out, and Cutting-Out

In this embodiment, the noodle dough can be produced by kneading the above-described materials for noodle dough according to a conventional method for producing instant noodles. More specifically, mixing water is added to the above-described raw material powder, and then the raw material powder and the various materials are well kneaded with a mixer to be uniformly mixed to prepare a noodle dough.

After prepared in such a manner as described above, the noodle dough is rolled out by a combiner into a noodle sheet. Then, the noodle sheet is rolled out, and noodle strings are cut out with a cutting blade from the noodle sheet. The noodle strings may be cut out as either noodles having no wave, such as straight noodles, or wavy noodles subjected to waving treatment using a wave box placed just below the cutting blade. In general, noodle strings having no wave are harder to loosen than wavy noodles, and therefore loosening-preventing effect obtained by the present invention is more effective for noodle strings having no wave.

A method for cutting out straight noodles is, but not limited to, a cutting-out method, such as one using a cutting-out machine described in Patent Literature 2 or 3, in which a noodle dough is passed through between a pair of cutting blade rolls to form a plurality of noodle strings without using a wave box, and the noodle strings are allowed to flow independently of one another using a scraper or air without synchronizing the flows of the noodle strings adjacent to each other so that the noodle strings are randomly stacked on a conveyor while bending without allowing the entire or part of the noodle strings adjacent to each other to form a mass. Alternatively, noodle strings may be formed by extruding the noodle dough through an extruder or the like.

3. Gelatinization Step

Then, the obtained noodle strings are gelatinized by, for example, steaming, boiling, treatment using overheated steam, or a combination of two or more of them according to a conventional method.

4. Loosening Agent-Attaching Step

In this embodiment, a loosening agent is attached to the surface of the thus gelatinized noodle strings by, for example, immersing the gelatinized noodle strings in a solution containing the loosening agent or spraying or showering a solution containing the loosening agent onto the gelatinized noodle strings.

In the case of noodles required to be subjected to a seasoning step after gelatinization to attach a liquid seasoning (liquid flavoring) to noodle strings, the loosening agent may be added to the liquid seasoning. Alternatively, the loosening agent may be attached to the surface of the noodle strings after the seasoning step by, for example, immersing the noodle strings in a solution containing the loosening agent or spraying or showering a solution containing the loosening agent onto the noodle strings.

The loosening agent-attaching step may be performed after a cutting and packing step that will be described later.

Examples of the loosening agent include: emulsifiers such as glycerin fatty acid ester, sucrose fatty acid ester, lecithin, starch sodium octenyl succinate, and casein sodium; emulsified oils and fats obtained by emulsifying oils and fats with these emulsifiers; and thickeners and degradation products thereof such as agar, carrageenan, gelatin, furcellaran, soybean polysaccharide, tamarind seed polysaccharide, tara gum, karaya gum, pectin, xanthan gum, sodium alginate, tragacanth gum, guar gum, locust beam gum, pullulan, gellan gum, gum arabic, glucomannan, psyllium seed gum, curdlan, *Agrobacterium* succinoglycan, hyaluronic acid, cyclodextrin, chitosan, crystalline cellulose, carboxymethylcellulose (CMC), propylene glycol alginate, and modified starch.

Among them, soybean-derived water-soluble hemicellulose as soybean polysaccharide, gum arabic, emulsified oils and fats, sucrose fatty acid ester, and lecithin are preferred, and soybean-derived water-soluble hemicellulose and gum arabic are particularly preferred. These loosening agents may be used singly or in combination of two or more of them.

5. Cutting and Packing

Then, the steamed noodle strings are cut into 20 to 50 cm lengths, and the cut noodle strings corresponding to one serving are prepared. The noodle strings need to be linearly stretched before cut, but this noodle string-stretching step may be performed either before or after the loosening agent-attaching step. The cut noodle strings are packed in a retainer (frame for drying) to form a noodle block. In a case where noodle strings are formed by extrusion using an extruder or the like, the noodle strings are cut before the steaming step. In this case, the cut noodle strings are packed in a bucket or the like and steamed, and the steamed noodle strings are subjected to the loosening agent-attaching step and then taken out of the bucket and packed in a retainer (frame for drying) to form a noodle block.

The shape of the retainer varies depending on a container in which the noodle block is to be packaged, and is therefore not particularly limited. However, the retainer is preferably a substantially cup-shaped or substantially deep dish-shaped retainer for instant noodles, which has a bottom surface that is substantially horizontal and a side surface that rises from the bottom surface, has no air permeability, and has a smooth surface with no irregularities. The bottom surface preferably has a plurality of small holes formed for air permeability. The small holes formed in the bottom surface preferably have a diameter of about 0.5 to 6.0 mm and are substantially uniformly distributed. The total area of the small holes formed in the bottom surface is not particularly limited, but is preferably 10 to 60% of the area of the bottom surface of the retainer. In a case where hot air is blown onto the noodle strings downward from above the retainer in a first drying step that will be described later, the total area of the small holes formed in the bottom surface is particularly preferably 10 to 30% of the area of the bottom surface of the retainer to make the noodle block bulky.

In the first drying step, hot air having a high wind speed is blow onto the noodle strings. Therefore, in order to prevent the noodle strings from flying out of the retainer, measures are preferably taken by, for example, covering the retainer with a lid formed from a punched plate, attaching a ring surrounding the retainer, or allowing the retainer to have a large depth.

6. First Drying Step

Then, a first drying step is performed in which the noodle strings packed in the retainer are dried with hot air having a wind speed of 30 m/s or higher and a temperature of 60 to 160° C. for 5 to 240 seconds.

A method for blowing hot air onto the noodle strings is not particularly limited. However, in order to sufficiently loosen the noodle strings during drying, it is preferred that hot air is vertically blown onto the noodle strings downward from above the retainer. Alternatively, it is also preferred that, when a retainer having a plurality of small holes is used, hot air is blown onto the noodle strings vertically to the retainer from above the retainer downward and from below the retainer upward at the same time or alternately. If hot air is vertically blown onto the noodle strings only from below the retainer upward, a sufficient loosening effect is hard to obtain because the hot air first collides with the bottom surface of the retainer, and therefore its power is reduced. Further, if strong air is blown onto the noodle strings, the noodle strings are likely to be blown off, which makes it difficult to maintain the shape of the noodles.

If the temperature of hot air is lower than 60° C., drying efficiency is low. Therefore, the surface of the noodle strings remains sticky, and a sufficient loosening effect cannot be obtained. Further, the moisture content of the noodle strings is hard to reduce, and therefore the density of the noodle strings near the bottom surface of the retainer is high due to the weight of the noodle strings so that a bulky noodle block that is easily loosened cannot be obtained. Further, if the temperature of hot air is higher than 160° C., the noodle strings are excessively rapidly dried, which is likely to cause problems such as burning of surface of the noodle strings, discoloration of the noodle strings, and uneven foaming. The temperature of hot air is particularly preferably 80 to 120° C. to dry the noodle strings in a short time and achieve a desirable texture with cooked feeling.

If the wind speed of hot air is less than 30 m/s, the effect of sufficiently loosening the noodle strings cannot be obtained, and if the wind speed of hot air is 80 m/s or higher, there is a problem that the noodle strings fly out of the retainer. The wind speed of hot air is particularly preferably in the range of 50 to 70 m/s.

A device for blowing air onto the noodle strings may be of any type as long as the device can achieve such a high wind speed. An example of such a device is a system in which an airflow sent from a powerful fan is focused through an ejector to increase the injection speed of the airflow. The device may have a tubular injection nozzle or a slit-like injection nozzle as the ejector, and such nozzles are preferably placed above and below the retainer to vigorously inject hot air from the nozzles. When such a strong spot airflow is blown onto the noodle strings, the noodle strings are more agitated and therefore can be loosened during drying to make the noodle block bulky.

Specifically, a high-temperature air drying device for use in puffing and drying snack foods or baking or roasting various processed foods, such as one described in JP 9-47224 A or JP 2003-90680 A, may be used in which the retainer is slowly transferred under a nozzle. Alternatively, a device described in JP 9-210554 A may be used in which the retainer is transferred between injection nozzles disposed above and below the retainer.

Further, when the temperature of hot air is 100° C. or higher, long-time drying causes puffing and foaming of the noodle strings, and therefore the noodle strings cannot have a texture like fresh noodles. For this reason, the time of the first drying step is preferably set so that puffing and foaming do not occur and the moisture content of the noodle strings after the first drying step is in the range of about 40 to 55%.

Further, if hot air is continued to be strongly blown onto the noodle strings from above the retainer downward for a long time even after the noodle strings stop moving, irrespective of the temperature of hot air, there are problems that the noodles are compressed by air pressure and that the noodle block shrinks due to rapid drying, which results in poor loosening. On the other hand, if the time of the first drying step is too short, the moisture content of the noodle block is not sufficiently reduced, and therefore the noodles are compressed by their own weight. This makes it difficult to obtain a bulky noodle block that is easily loosened.

For this reason, in the first drying step, drying is preferably performed until just before the movement of the noodle strings slows down and then stops. Depending on the conditions of hot air such as temperature and wind speed, the time of the first drying step is preferably in the range of 5 to 240 seconds, particularly preferably in the range of 30 to 150 seconds.

7. Second Drying Step

After the first drying step, a second drying step is performed to dry the noodle strings with hot air so that the moisture content of the noodle strings is in the range of 5 to 14%. Here, the hot-air drying can be performed by a conventional hot-air drying method. A hot-air dryer to be used may be of any type, and examples thereof include a box-type hot-air dryer, a tunnel-type hot-air dryer, and a spiral-type hot-air dryer. Rapid drying causes shrinkage of the noodle block, which causes poor loosening. For this reason, the hot-air drying is preferably performed under conditions where the temperature of hot air is about 60 to 100° C. If the temperature of hot air is lower than 60° C., the time required for drying increases, which results in inefficient drying. On the other hand, if the temperature of hot air is higher than 100° C., uneven drying or burning of the noodle block is likely to occur. The hot-air drying is preferably performed for about 20 to 120 minutes. The wind speed of hot air is not particularly limited, but is preferably in a usual range of about 1 to 5 m/s.

The second drying step may be performed under a single condition or combined multiple conditions. Further, after the second drying step, puffing treatment using high-temperature and high-speed hot air, high-temperature and high-speed hot air and saturated water vapor, or overheated water vapor may be performed as described in JP 2012-60999 A.

8. Cooling Step

After dried, the noodle block is cooled for a predetermined time. Then, the retainer is lifted up to remove the noodle block from the retainer. In this way, the noodle block after drying is obtained.

As described above, when a loosening agent for noodles is attached to noodle strings gelatinized by steaming or the like, and then hot air having a high wind speed is immediately blown onto the noodle strings, the surface of the noodle strings is quickly dried so that sticking together of the noodle strings can be prevented during drying the noodle strings, and the moisture content of the noodle strings is reduced by loosening the noodle strings during drying so that the noodle strings can be prevented from being closely packed together near the bottom surface of the retainer due to their own weight. As a result, the noodle strings are well dried, which makes it possible to produce dried instant noodles that are easily loosened and quickly rehydrated with hot water at the time of eating.

A method for cutting out noodle strings used in this embodiment is not particularly limited. However, the present invention is particularly effective for noodle strings having no wave, such as so-called straight noodles, because noodle strings having no wave are likely to be closely packed together.

It is to be noted that the present invention is not limited to the above embodiment, and various changes may be made to embodiments without departing from the scope of the present invention. Further, the above embodiment includes inventions in various stages, and various inventions can be extracted by appropriately combining the disclosed components. For example, even when some of all the components disclosed in the embodiment are omitted or some components in other forms are combined, the thus obtained structure can be extracted as an invention as long as the technical problem described above in the section of Technical Problem can be solved and the advantageous effects described above in the section of Advantageous Effects of Invention can be obtained.

EXAMPLES

Hereinbelow, this embodiment will be described in more detail with reference to examples.

Experiment 1

Examination of Effectiveness of Combination of Loosening Agent-Attaching Step and First Drying Step Example 1-1

Case where the Loosening Agent was Attached and the First Drying Step was Performed First, 850 g of wheat flour and 150 g of starch were mixed, and then 400 mL of mixing water containing 20 g of salt, 3 g of brine, and 1 g of polymer phosphate dissolved therein was added thereto. The thus obtained mixture was kneaded in a normal pressure mixer for 15 minutes to obtain a noodle dough.

The obtained noodle dough was formed into a noodle sheet, and two noodle sheets were combined into one noodle sheet. The thus obtained noodle sheet was repeatedly rolled out to have a final thickness of 1.2 mm. Then, noodle strings were cut out as so-called straight noodles according to a method described in Example in Patent Literature 2. More specifically, the rolled-out dough was supplied to a pair of No. 16 cutting blade rolls each having a diameter of 3.7 mm and a width of 21.5 cm to form noodle strings, and the noodle strings were allowed to fall onto a conveyer without using a guiding tube. A scraper was provided in which adjacent separating teeth were different in position in the circumferential direction of the cutting blade roll. At this time, the noodle strings were cut out at a speed of 1000 cm/min, and the conveyor was operated at a speed of 170 cm/min, and a distance between a contact point where the pair of cutting blade rolls were in contact with each other and the conveyor was set to 5 cm.

The cut-out noodle strings were immediately steamed for 2 minutes and then boiled for 10 seconds to obtain steamed noodles. Then, the obtained steamed noodles were immersed in a liquid seasoning containing 10 g of salt per liter dissolved therein and warmed at 60° C. for about 6 seconds, and the noodle strings were stretched. Then, an aqueous solution containing 50 g of gum arabic per liter dissolved therein was showered onto the noodle strings so that the amount of the solution per serving was 10 g.

Then, the noodle strings were cut into 30 to 50 cm lengths, and the cut noodle strings corresponding to one serving were put into a substantially deep dish-shaped retainer. The retainer had a capacity of about 450 cc, an opening with a diameter φ of 137 mm, a height of 40 mm, a taper angle of 20°, and small holes formed in its side surface to have a diameter φ of 4.0 mm. The small holes were almost uniformly provided in the entire bottom surface of the retainer, and the ratio of the total area of the small holes to the area of the bottom surface of the retainer was 58%. The weight of the noodles in the retainer was 170 g.

An aggregate of the noodle strings was subjected to the first drying step by blowing hot air having a temperature of 100° C. and a wind speed of 70 m/s from above and below the retainer for 72 seconds.

The noodle block subjected to the first drying step was then subjected to the second drying step by treating the noodle block with hot air having a temperature of 90° C. and a wind speed of 4 m/s for 60 minutes to obtain 70 g of a dried noodle block.

Comparative Example 1-1

Case where the Loosening Agent was Attached but the First Drying Step was Omitted A dried noodle block was produced in the same manner as in Example 1-1 except that the first drying step was omitted.

Comparative Example 1-2

Case where the Loosening Agent was not Attached but the First Drying Step was Performed A dried noodle block was produced in the same manner as in Example 1-1 except that the aqueous solution containing gum arabic dissolved therein was changed to water.

Comparative Example 1-3

Case where the Loosening Agent was not Attached and the First Drying Step was Omitted A dried noodle block was produced in the same manner as in Comparative Example 1-1 except that the aqueous solution containing gum arabic dissolved therein was changed to water.

Example 1-2

Case where Wavy Noodle Strings were Cut Out and the First Drying Step was Performed A dried noodle block was produced in the same manner as in Example 1-1 except that wavy noodle strings were cut out.

Comparative Example 1-4

Case where Wavy Noodle Strings were Cut Out but the First Drying Step was Omitted A dried noodle block was produced in the same manner as in Example 1-2 except that the first drying step was omitted.

Each of these samples was put into a polystyrene container, rehydrated by pouring 500 mL of boiling water and covering the container with a lid, and eaten after waiting for 4 minutes. The loosening of the sample at the time of eating was sensory evaluated by five experienced panelists according to the following criteria: Level 5: loosening is excellent, Level 4: the sample is easily loosened with chopsticks, Level 3: the sample is loosened with chopsticks, Level 2: the sample is slightly hard to loosen with chopsticks, and Level 1: the sample is hard to loosen with chopsticks due to heavy sticking.

Further, the height of the noodle block was measured in the following manner. The height of the noodle block was measured at a total of five points on any diameter, i.e., at the both ends of the noodle block, the center of the noodle block, and the middle points between the center and each end of the noodle block. The average of values measured at the five points was regarded as the height of the noodle block. Three noodle blocks per test group were subjected to the measurement, and the average height of the three noodle blocks was regarded as the height of the noodle block of each test group.

In the following experiments, the sensory evaluation and the measurement of the height of the noodle block were performed in the same manner.

It is to be noted that the results of the sensory evaluation and the results of measurement of the height of the noodle block in Experiment 1 were shown in Table 1.

TABLE 1

| Test Group | Example 1-1 | Comparative Example 1-1 | Comparative Example 1-2 | Comparative Example 1-3 |
|---|---|---|---|---|
| Cut-out noodle strings | Straight | Straight | Straight | Straight |
| Loosening agent | Attached | Attached | Not attached | Not attached |
| First drying step | Performed | Omitted | Performed | Omitted |
| Loosening at the time of eating | 4.5 | 2 | 2.5 | 1 |
| Height of noodle block (mm) | 25.1 | 19.0 | 21.7 | 19.7 |

| Test Group | Example 1-2 | Comparative Example 1-4 |
|---|---|---|
| Cut-out noodle strings | Wavy | Wavy |
| Loosening agent | Attached | Attached |
| First drying step | Performed | Omitted |
| Loosening at the time of eating | 5.0 | 3.5 |
| Height of noodle block (mm) | 25.7 | 21.5 |

As a result of comparison among these results, it was confirmed that in Example 1-1, the noodle strings could be loosened during drying in the first drying step due to their movement on the verge of flying out of the retainer. Further, the noodle block had a large height, and loosening at the time of eating was good.

In Comparative Example 1-1, the noodles were compressed due to their own weight probably because the first drying step was omitted, and therefore the noodle block had a small height. Further, the noodles were partly stuck together, and were therefore hard to loosen at the time of eating.

In Comparative Example 1-2, the noodle strings were poorly moved in the first drying step, and therefore the noodle block had a smaller height than that of Example 1-1. Further, the noodles were partly stuck together, and were therefore slightly hard to loosen at the time of eating.

In Comparative Example 1-3, the noodles were compressed due to their own weight probably because the first drying step was omitted, and therefore the noodle block had a small height. Further, the noodles were entirely stuck together, and were therefore very hard to loosen at the time of eating.

In Example 1-2, it was confirmed that the noodle strings could be loosened during drying in the first drying step due to their movement on the verge of flying out of the retainer. Further, the noodle block had a large height, and loosening at the time of eating was excellent.

In Comparative Example 1-4, the noodle block had a larger height than that of Comparative Example 1-1. The noodles were partly stuck together, but could be easily loosened at the time of eating.

That is, the wavy noodles could be easily loosened even when the first drying step was omitted, but could be more easily loosened by performing the first drying step.

Experiment 2

Study of Conditions of First Drying Step

Experiment 2-1

Study of Wind Speed Condition of First Drying Step

Dried noodle blocks were produced in the same manner as in Example 1-1 except that the wind speed of the first drying step was changed to 30 m/s and 50 m/s, respectively. These examples were defined as Example 2-1-1 and Example 2-1-2, respectively.

A dried noodle block was produced in the same manner as in Example 1-1 except that the wind speed of the first drying step was changed to 20 m/s. This example was defined as Comparative Example 2-1.

It is to be noted that the results of the sensory evaluation and the results of measurement of the height of the noodle block in Experiment 2-1 were shown in Table 2. For reference purposes, the results of Example 1-1 were also shown in Table 2.

TABLE 2

| Test Group | Comparative Example 2-1 | Example 2-1-1 | Example 2-1-2 | Example 1-1 |
|---|---|---|---|---|
| Wind speed of first drying step | 20 m/s | 30 m/s | 50 m/s | 70 m/s |
| Loosening at the time of eating | 2.5 | 3.5 | 4.5 | 4.5 |
| Height of noodle block (mm) | 21.5 | 22.0 | 22.7 | 25.1 |

As a result of comparison among these results, in Comparative Example 2-1, the noodle strings were hardly moved in the first drying step. Further, the noodle block had a small height, and loosening at the time of eating was slightly poor.

In Example 2-1-1, the noodle strings were slightly moved in the first drying step. Further, the noodle block had a larger height than that of Comparative Example 2-1, and loosening at the time of eating was not so bad.

In Example 2-1-2, the noodle strings were well moved in the first drying step, and therefore could be loosened during drying. Further, the noodle block had a large height, and loosening at the time of eating was good.

Experiment 2-2

Study of Temperature Condition of First Drying Step

Dried noodle blocks were produced in the same manner as in Example 1-1 except that the temperature of the first drying step was changed to 60° C., 80° C., 120° C., and 155° C., respectively. These examples were defined as Example 2-2-1, Example 2-2-2, Example 2-2-3, and Example 2-2-4, respectively.

Further, a dried noodle block was produced in the same manner as in Example 1-1 except that the temperature of the first drying step was changed to 30° C. This example was defined as Comparative Example 2-2.

It is to be noted that the results of the sensory evaluation and the results of measurement of the height of the noodle block in Experiment 2-2 were shown in Table 3. For reference purposes, the results of Example 1-1 were also shown in Table 3.

TABLE 3

| Test Group | Comparative Example 2-2 | Example 2-2-1 | Example 2-2-2 |
|---|---|---|---|
| Temperature of first drying step | 30° C. | 60° C. | 80° C. |
| Loosening at the time of eating | 2.5 | 3.5 | 5 |
| Height of noodle block (mm) | 20.6 | 23.5 | 26.3 |

| Test Group | Example 1-1 | Example 2-2-3 | Example 2-2-4 |
|---|---|---|---|
| Temperature of first drying step | 100° C. | 120° C. | 155° C. |
| Loosening at the time of eating | 4.5 | 4 | 4 |
| Height of noodle block (mm) | 25.1 | 24.9 | 22.1 |

As a result of comparison among these results, in Comparative Example 2-2, the noodle strings were moved until the end of the first drying step, but the moisture content of the noodle strings was poorly reduced, and therefore the height of the noodle block was significantly reduced due to the weight of the noodles during the second drying step. At the time of eating, the noodle strings were partly stuck together, and were therefore slightly hard to loosen. The surface of the noodle strings had a soft texture, and the core of the noodle strings was slightly poor in viscoelasticity.

In Example 2-2-1, the noodle strings could be moved during drying until the end of the first drying step, but a reduction in the moisture content of the noodle strings was slightly smaller than that in Example 2-2-2, and therefore the height of the noodle block was reduced due to the weigh of the noodles during the second drying step. At the time of eating, the noodle strings were partly stuck together, but could be easily loosened. Although the core of the noodle strings was slightly poor in viscoelasticity, but the noodle strings generally had a good texture.

In Example 2-2-2, the noodle strings could be moved during drying until the end of the first drying step. A reduction in the height of the noodle block caused by the weight of the noodles did not occur even when the noodle strings were further dried in the second drying step, and therefore loosening at the time of eating was excellent. The core of the noodle strings had viscoelasticity, and therefore the noodle strings had a good texture.

In Example 1-1, the movement of the noodle strings was slightly inferior to that in Example 2-2-2 due to a reduction in moisture content in the latter half of the first drying step. As a result, the height of the noodle block was slightly reduced due to wind pressure, but loosening at the time of eating was generally good. The core of the noodle strings had viscoelasticity, and therefore the noodle strings had an excellent texture.

In Example 2-2-3, the movement of the noodle strings was inferior to that in Example 2-2-2 due to a reduction in moisture content in the middle of the first drying step. As a result, the height of the noodle strings was reduced due to wind pressure, but loosening at the time of eating was generally good. The core of the noodle strings had viscoelasticity, and therefore the noodle strings had an excellent texture.

In Example 2-2-4, the movement of the noodle strings was inferior to that in Example 2-2-2 due to a reduction in moisture content at the beginning of the first drying step. The height of the noodle block was reduced due to shrinkage considered to be due to wind pressure or high-temperature drying, but loosening at the time of eating was generally good. The noodle strings had a viscoelastic core but had a firm surface, and therefore the texture of the noodle strings was hard. Further, the noodle strings were partly puffed.

Experiment 2-3

Study of Time of First Drying Step

Dried noodle blocks were produced in the same manner as in Example 1-1 except that the time of the first drying step was changed to 13 seconds, 36 seconds, 144 seconds, and 216 seconds, respectively. These examples were defined as Example 2-3-1, Example 2-3-2, Example 2-3-3, and Example 2-3-4, respectively.

A dried noodle block was produced in the same manner as in Example 1-1 except that the temperature of the first drying step was changed to 60° C. and the drying time was changed to 240 seconds. This example was defined as Example 2-3-5.

Dried noodle blocks were produced in the same manner as in Example 1-1 except that the temperature of the first drying step was changed to 155° C. and the drying time was changed to 5 seconds and 10 seconds, respectively. These examples were defined as Example 2-3-6 and Example 2-3-7, respectively.

It is to be noted that the results of the sensory evaluation and the results of measurement of the shape of the noodle block in Experiment 2-3 were shown in Table 4. For reference purposes, the results of Example 1-1 were also shown in Table 4.

TABLE 4

| Test Group | Example 2-3-1 | Example 2-3-2 | Example 1-1 | Example 2-3-3 |
| --- | --- | --- | --- | --- |
| Drying temperature | 100° C. | 100° C. | 100° C. | 100° C. |
| Drying time | 13 seconds | 36 seconds | 72 seconds | 144 seconds |
| Loosening at the time of eating | 3.0 | 4.0 | 4.5 | 3.5 |
| Height of noodle block (mm) | 23.5 | 26.3 | 25.1 | 24.9 |

| Test Group | Example 2-3-4 | Example 2-3-5 | Example 2-3-6 | Example 2-3-7 |
| --- | --- | --- | --- | --- |
| Drying temperature | 100° C. | 60° C. | 155° C. | 155° C. |
| Drying time | 216 seconds | 240 seconds | 5 seconds | 10 seconds |
| Loosening at the time of eating | 3.0 | 3.0 | 3.0 | 3.5 |
| Height of noodle block (mm) | 22.7 | 21.1 | 22.2 | 22.8 |

As a result of comparison among these results, in Example 2-3-1, the noodle strings could be moved during drying until the end of the first drying step, but a reduction in the moisture content of the noodle strings was smaller than that in Example 1-1, and therefore the height of the noodle block was reduced during the second drying step probably due to the weight of the noodles. At the time of eating, the noodle strings were partly stuck together, but could be loosened with chopsticks.

In Example 2-3-2, the noodle strings could be moved during drying until the end of the first drying step. A reduction in the height of the noodle block did not occur even when the noodle strings were further dried in the second drying step, and therefore loosening at the time of eating was generally good.

In Example 2-3-3, the noodle strings were hardly moved after a lapse of about 72 seconds in the first drying step, and as a result, the height of the noodle block was smaller than that of Example 1-1 probably due to the shrinkage of the noodle block caused by wind pressure. At the time of eating, the noodle strings were partly stuck together, but could be easily loosened with chopsticks.

In Example 2-3-4, the noodle strings were hardly moved after a lapse of about 72 seconds in the first drying step, and the height of the noodle block was smaller than that of Example 1-1 probably due to the shrinkage of the noodle block caused by wind pressure or high-temperature drying. At the time of eating, the noodle strings were partly stuck together, but could be loosened with chopsticks.

In Example 2-3-5, the noodle strings were hardly moved after a lapse of about 144 seconds in the first drying step, and the height of the noodle block was smaller than that of Example 1-1 probably due to the shrinkage of the noodle block caused by wind pressure or rapid drying. At the time of eating, the noodle strings were partly stuck together, but could be loosened with chopsticks.

In Example 2-3-6, the noodle strings were moved until the end of the first drying step, but the moisture content of the noodle strings was not sufficiently reduced probably due to a short drying time, and therefore the height of the noodle block was reduced to be smaller than that of Example 1-1 during the second drying step probably due to the weight of the noodles. At the time of eating, the noodle strings were partly stuck together, but could be loosened with chopsticks.

In Example 2-3-7, the noodle strings were moved until the end of the first drying step, but the moisture content of the noodle strings was not sufficiently reduced probably due to a short drying time, and therefore the height of the noodle block was reduced to be smaller than that of Example 1-1 during the second drying step probably due to the weight of the noodles. At the time of eating, the noodle strings were partly stuck together, but could be easily loosened with chopsticks.

Experiment 3

Study of Loosening Agent

Dried noodle blocks were produced in the same manner as in Example 1-1 except that 50 g of gum arabic used as a loosening agent in Example 1-1 was changed to 20 g of a soybean-derived water-soluble hemicellulose product (soybean-derived water-soluble hemicellulose 82, lecithin 12, lactose 6), 20 g of an emulsified oil and fat product (rapeseed oil 95: glycerin fatty acid ester 5), and 15 g of sucrose fatty acid ester (HLB11), respectively. These examples were defined as Example 3-1, Example 3-2, and Example 3-3, respectively.

It is to be noted that the results of the sensory evaluation and the results of measurement of the shape of the noodle block in Experiment 3 were shown in Table 5. For reference purposes, the results of Example 1-1 were also shown in Table 5.

TABLE 5

| Test Group | Example 1-1 | Example 3-1 | Example 3-2 | Example 3-3 |
|---|---|---|---|---|
| Type of Loosening Agent | Gum arabic | Soybean hemicellulose | Emulsified oil and fat | Sucrose fatty acid ester |
| Loosening at the time of eating | 4.5 | 4.5 | 3.5 | 4.5 |
| Height of noodle block (mm) | 25.1 | 26.7 | 23.1 | 25.1 |

As a result of comparison among these results, in Example 1-1, the noodle strings were well moved in the first drying step. The noodle block had a large height, and loosening at the time of eating was generally good.

The movement of the noodle strings during the first drying step was better in Example 3-1 than in Example 1-1 using gum arabic. The height of the noodle block was also larger in Example 3-1 than in Example 1-1 using gum arabic, and loosening at the time of eating in Example 3-1 was generally as good as that in Example 1-1 using gum arabic.

The movement of the noodle strings during the first drying step was better in Example 1-1 using gum arabic than in Example 3-2, and the height of the noodle block was also higher in Example 1-1 using gum arabic than in Example 3-2. Loosening at the time of eating was also better in Example 1-1 using gum arabic than in Example 3-2. In Example 3-2, the noodle strings were partly stuck together, but could be easily loosened.

The movement of the noodle strings during the first drying step in Example 3-3 was as good as that in Example 1-1 using gum arabic. The noodle block of Example 3-3 was also as high as that of Example 1-1 using gum arabic. Loosening at the time of eating in Example 3-3 was also as good as that in Example 1-1 using gum arabic, but a soup obtained in Example 3-3 was whitish.

The invention claimed is:

1. A method for producing dried instant noodles, comprising:
    attaching a loosening agent for noodles to gelatinized noodle strings;
    placing the noodle strings into a retainer to form a noodle block;
    a first drying in which, after the loosening agent-attaching, hot air having a wind speed of 50-70 m/s and a temperature of 60° C. to 160° C. is blown onto the noodle strings packed in the retainer from above the retainer downward or from above the retainer downward and from below the retainer upward for 5 to 240 seconds to dry the noodle strings such that the noodle strings have a moisture content of 40-55% after the first drying; and, after the first drying,
    a second drying in which, after the first drying, the noodle strings are dried with hot air having a wind speed of 1 to 5 m/s and a temperature of 60 to 100° C. for 20 to 120 minutes,
    wherein the retainer has a substantially cup-shaped or substantially deep dish-shaped container having a bottom surface that is substantially horizontal and a side surface rising from the bottom surface, and
    the first drying is performed such that puffing and foaming of the noodle strings do not occur.

2. The method for producing dried instant noodles according to claim 1, wherein the gelatinized noodle strings are gelatinized noodle strings having no wave.

3. The method for producing dried instant noodles according to claim 1, wherein the loosening agent for noodles contains at least one of gum arabic, soybean-derived water-soluble hemicellulose, sucrose fatty acid ester, emulsified oil and fat, or lecithin.

4. The method for producing dried instant noodles according to claim 1, wherein, in the first drying, hot air is blown onto the noodle strings packed in the retainer from above the retainer downward is not blown from below the retainer upward.

* * * * *